United States Patent [19]

Binns

[11] 4,188,554
[45] Feb. 12, 1980

[54] ALTERNATING CURRENT ROTATING ELECTRIC MACHINE

[75] Inventor: Kenneth J. Binns, Chandler's Ford, England

[73] Assignee: The University of Southampton, Southampton, England

[21] Appl. No.: 860,072

[22] Filed: Dec. 13, 1977

[51] Int. Cl.$^2$ ............................................. H02K 21/08
[52] U.S. Cl. .................................. 310/156; 310/162; 310/163
[58] Field of Search ............................. 310/152–156, 310/162–168, 261

[56] References Cited

FOREIGN PATENT DOCUMENTS

| 1177247 | 1/1970 | United Kingdom | 310/156 |
| 1324147 | 7/1973 | United Kingdom | 310/156 |

Primary Examiner—Donovan F. Duggan
Attorney, Agent, or Firm—Scrivener, Parker, Scrivener & Clarke

[57] ABSTRACT

An alternating current rotating electric machine having a permanent magnet rotor comprising a generally cylindrical body of magnetic material having a plurality of regularly spaced, inwardly extending slots formed around its circumference so as to define pole-pieces therebetween connected by magnetic material of the body at the base of the slots, and a plurality of permanent magnets which are located in said slots so as to induce poles of alternate polarity in the pole-pieces, the central axes of the slots being uniformly inclined relative to respective radii of the body which pass through the centers of the outer open ends of the slots, and the magnetic axes of the magnets extending transversely of the respective central axes of the slots.

11 Claims, 1 Drawing Figure

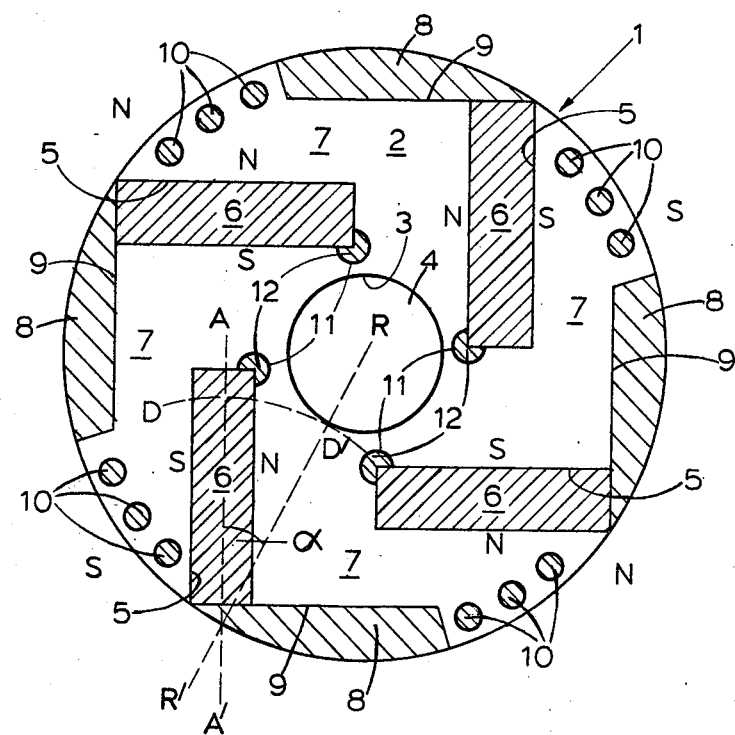

ALTERNATING CURRENT ROTATING ELECTRIC MACHINE

This invention relates to alternating current rotating electric machines, that is to say, motors and generators of the alternating current synchronous type having a rotating field with permanent magnet excitation.

In our British Pat. No. 1,263,300 we disclosed an alternating current rotating electric machine having a permanent magnet rotor comprising a generally cylindrical body of magnetic material having a plurality of regularly spaced, inwardly extending slots formed around its circumference so as to define pole-pieces therebetween connected by magnetic material of the body at the base of the slots and a plurality of permanent magnets which are located in said slots so as to induce poles of alternate polarity in the pole-pieces.

In the preferred illustrated rotor, each of the slots and a permanent magnet received therein is symmetrical about a central radially extending axis and magnetic axis of the magnet extends perpendicularly of the radial axis so that the permanent magnet pole faces abut the sides of the pole-pieces. The magnets are substantially rectangular with their long dimensions parallel to their magnetic axes.

The principal advantage of this rotor is improved starting characteristics due to the flux paths provided by the rotor body around each magnet between adjacent pole-pieces, these flux paths allowing an induction motor action and protecting the magnets against demagnetisation.

The present invention consists in an improvement to this known rotor which consists in providing the slots so that their central axes are uniformly inclined relative to the radii through their outer open ends, whereby the slots can be made deeper as compared with radial slots so as to accommodate magnets with pole faces that are correspondingly wider so that there is an increased surface area for the magnets to pass magnetic flux into the pole-pieces.

The invention will now be described by way of example with reference to the accompanying drawing showing a section through a preferred form of rotor used according to the invention.

The rotor has a generally cylindrical body 1 formed by a stack of one-piece disc-shaped laminations 2 composed of magnetic material, each having a central aperture 3 by which it is assembled with the others on a rotor shaft 4 so that the laminations extend normal to the axis of rotation of the rotor. Each lamination 2 has four slots 5 in it, extending inwards from its outer periphery and regularly spaced around said periphery. Each slot 5 is rectangular in outline and has a central longitudinal axis AA' which is inclined at an angle $\alpha$ relative to the radius RR' of the lamination passing through the centre C of the outer open end of the slot, all four of the slots being inclined in the same sense and to the same degree, $\alpha$. A permanent magnet 6, with the same outline as the slots 5, is located in each slot with its magnetic axis extending perpendicularly of said central axis AA' of the slot so that the pole faces N, S of the magnet abut the sides of the slot and direct flux into the adjacent portions 7 of the body between the slots. The magnets are arranged so that adjacent magnets have like pole faces abutting the intermediate portion 7 of the body, which thereby becomes a pole-piece with a peripheral pole of the corresponding polarity N or S, four such poles of alternate polarity being formed around the rotor.

In the illustrated embodiment having four slots 5 and four peripheral poles N,S, the slots 5 are inclined at an angle $\alpha$ equal to 45°, to the radii RR' so that adjacent slots and magnets are arranged with their axes perpendicular to one another.

The inclination of the slots 5 relative to the radii RR' allows them to be made deeper as compared with radial slots. This is demonstrated in the drawing by the arc DD' which is drawn with centre C at the mouth of a slot 5 and with a radius equal to the maximum depth of a radial slot centred on RR' as determined by the presence of the rotor shaft 4. The slot 5 extends beyond the arc DD', as shown, and is not restricted in length because of the presence of the rotor shaft. The consequence of deeper slots 5 is that they can accommodate magnets 6 with correspondingly wider pole faces N,S which can therefore pass a larger magnetic flux into the pole-pieces. The performance of the rotor is thereby improved.

Each of the magnets is held in place in its slot by a block of non-magnetic material 8, for example aluminium, which is set into a notch 9 in the periphery of the body so as to close the outer open end of the slot. Each block 8 extends circumferentially from the magnet 6 to the other side of the radius RR' to that occupied by the magnet, thereby producing a restriction in the cross-section of the pole-piece 7 and localising the corresponding pole opposite the outwardly angled face of the adjacent magnet so as to concentrate the magnetic flux intensity. Preferably, the blocks 7 are cast in situ with aluminium bars 10 that extend axially of the rotor in the peripheral portions of the pole-pieces 7, the blocks 8 and bars 10 being connected to end rings (not shown) so as to form a squirrel cage.

The use of one-piece laminations to form the rotor body gives the rotor increased strength, which is enhanced further by the squirrel cage.

One-piece laminations also produce a rotor body in which adjacent pole-pieces 7 are connected by the portions 11 at the base of the slots 5 adjacent the rotor shaft 4, thereby producing a low reluctance path for flux between adjacent pole-pieces which improves the starting characteristics of the rotor by virtue of the resultant reluctance motor action. These flux paths, by-passing the magnets 6, also reduce the tendency for the magnets to be de-magnetised during starting.

The rotor shaft 4 may be composed of magnetic or non-magnetic material. The body portions 11 at the base of the slots 5 allow an induction motor action that gives improved starting characteristics, and protect the magnets against de-magnetisation. The cross-sectional area of these body portions 11 may be restricted by providing notches 12 that communicate with the slots 5 and which may be filled with non-magnetic material, for example, aluminium that may be cast in situ simultaneously with the squirrel cage 8,10. The effectiveness of the flux paths between the pole-pieces 7 is thereby controlled so as to balance the improved starting characteristics against the slightly impaired performance caused by the flux paths during normal running.

The magnets may be of any type including ceramic, rare earth of polymer bonded magnets

I claim:

1. An alternating current rotating electric machine having a permanent magnet rotor comprising a generally cylindrical body of magnetic material having a plurality of regularly spaced, inwardly extending open ended slots formed around its circumference so as to define pole-pieces there between with adjacent pole-pieces connected by magnetic material of the body at the base of the slot between said adjacent pole-pieces; a plurality of permanent magnets which are located in said open ended slots so as to induce poles of alternate polarity in the pole-pieces, the central axes of the slots being uniformly inclined relative to respective radii of the body which pass through the centers of the outer open ends of the slots, and the magnetic axes of the magnets extending transversely of the respective central axes of the slots with the pole-faces of the magnets abutting opposite sides of the slots; and a peripheral portion of each pole-piece being formed with a notch that extends circumferentially from that side of the open end of a slot facing an adjacent slot towards said adjacent slot so as to restrict the cross-sectional area of the pole-piece and localize the corresponding pole to a region opposite the outwardly directed pole-face of a magnet in said adjacent slot.

2. A machine as claimed in claim 1 having four slots in the rotor body with central axes inclined at an angle of substantially 45° to said respective radii so that the central axes of adjacent slots and the magnetic axes of the magnets located therein are substantially perpendicular to one another.

3. A machine as claimed in claim 1 in which said notch is filled with a non-magnetic material which also closes the outer open end of said slot to hold the magnet in place in said slot.

4. A machine as claimed in claim 3 in which the rotor body incorporates a squirrel cage.

5. A machine as claimed in claim 4 in which the non-magnetic material in said notches forms part of the squirrel cage.

6. A machine as claimed in claim 5 in which the squirrel cage is composed of aluminium that is cast in situ in said rotor.

7. A machine as claimed in claim 1 in which a notch is formed at the base of each slot to reduce the cross-sectional area of said magnetic material of the body connecting adjacent pole-pieces.

8. A machine as claimed in claim 7 in which said notches at the base of the slots are filled with non-magnetic material.

9. A machine as claimed in claim 1 in which the rotor body is mounted on a rotor shaft of magnetic material.

10. A machine as claimed in claim 1 in which the rotor body is mounted on a rotor shaft of non-magnetic material.

11. A machine as claimed in claim 1 in which the rotor body comprises a stack of one-piece laminations with their faces extending perpendicular to the axis of rotation of the rotor.

* * * * *